S. G. MORRISON.
Mode of Applying Emery to Metal Surfaces.

No. 163,880.  Patented June 1, 1875.

Witnesses:  Inventor:

UNITED STATES PATENT OFFICE.

SAMUEL G. MORRISON, OF WILLIAMSPORT, PENNSYLVANIA.

IMPROVEMENT IN MODES OF APPLYING EMERY TO METAL SURFACES.

Specification forming part of Letters Patent No. 163,880, dated June 1, 1875; application filed September 1, 1874.

*To all whom it may concern:*

Be it known that I, SAML. G. MORRISON, of Williamsport, Pennsylvania, have invented a Mode of Applying Emery to the Surface of Metal Plates or Tools, of which the following is a specification:

The object of my invention is to apply emery grinding and cutting surfaces to metal blades, plates, and tools, as a composition or emery bake that adheres permanently to metal.

In carrying out my invention, that part of the metal plate or tool intended to be coated is first fluted, grooved, toothed, or perforated, then heated sufficient to melt the flour of sulphur. I then put on flour of sulphur, which melts and spreads upon the parts to which the emery-paste is to be applied, after which those parts are coated with dissolved gum-shellac.

The metal plate or tool having been thus prepared, a thick paste composed of dissolved gum-shellac into which is stirred about one part of pulverized sulphur and about seven parts of emery is spread on.

The metal plate or tool being secured in a strong mold, the paste is tamped into the matrix upon that part of the blade or tool intended to be coated with an emery surface, and, after being properly pressed and secured, placed in an oven sufficiently heated to melt the sulphur only.

Figure 1:
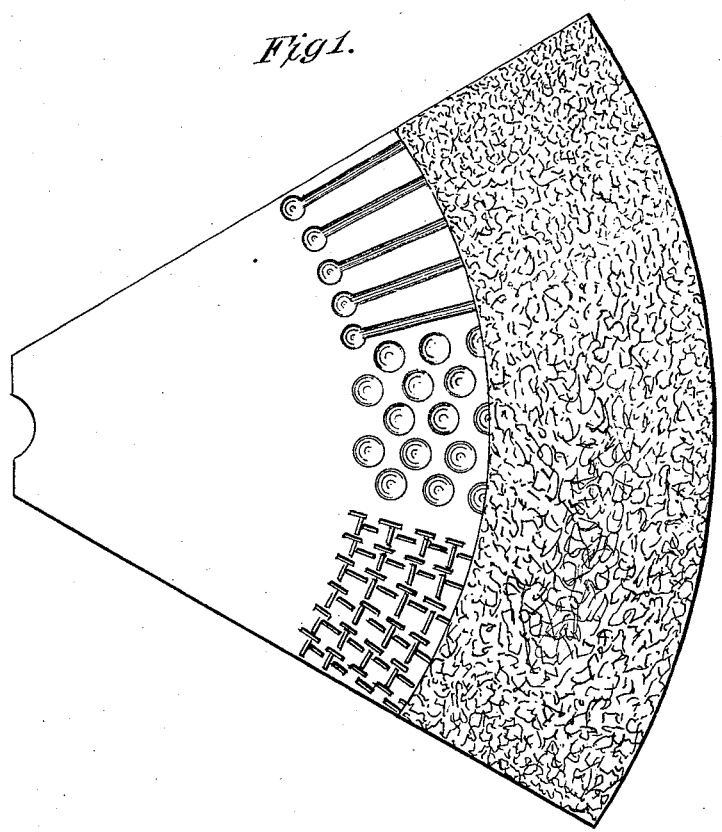
Figure 2:

To illustrate more in detail, I give a plan view of one metal tool only in Figure 1 in the drawing, showing my mode of applying emery-paste, baked, to metal surfaces, for the purpose of cutting, grinding, rubbing, drilling, sawing, &c.

I claim as my invention—

The process or mode of applying emery to metal surfaces for mechanical purposes, substantially as described.

SAMUEL G. MORRISON.

Witnesses:
HEPBURN McCLURE,
STEPHEN W. HALL.